Dec. 11, 1962     H. J. NORWOOD     3,067,723
FEEDER
Filed Jan. 7, 1960     3 Sheets-Sheet 1

INVENTOR.
HERSHEL J. NORWOOD
BY M. A. Hobbs
ATTORNEY

Dec. 11, 1962     H. J. NORWOOD     3,067,723
FEEDER

Filed Jan. 7, 1960     3 Sheets-Sheet 2

*INVENTOR.*
HERSHEL J. NORWOOD
BY *M. A. Hobbs*
ATTORNEY

Dec. 11, 1962 H. J. NORWOOD 3,067,723
FEEDER
Filed Jan. 7, 1960 3 Sheets-Sheet 3
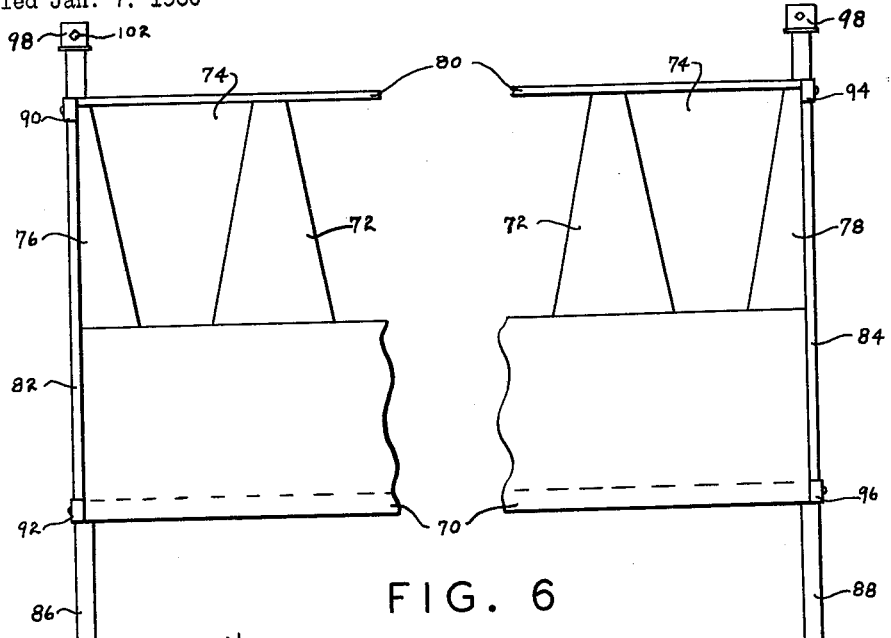
FIG. 6
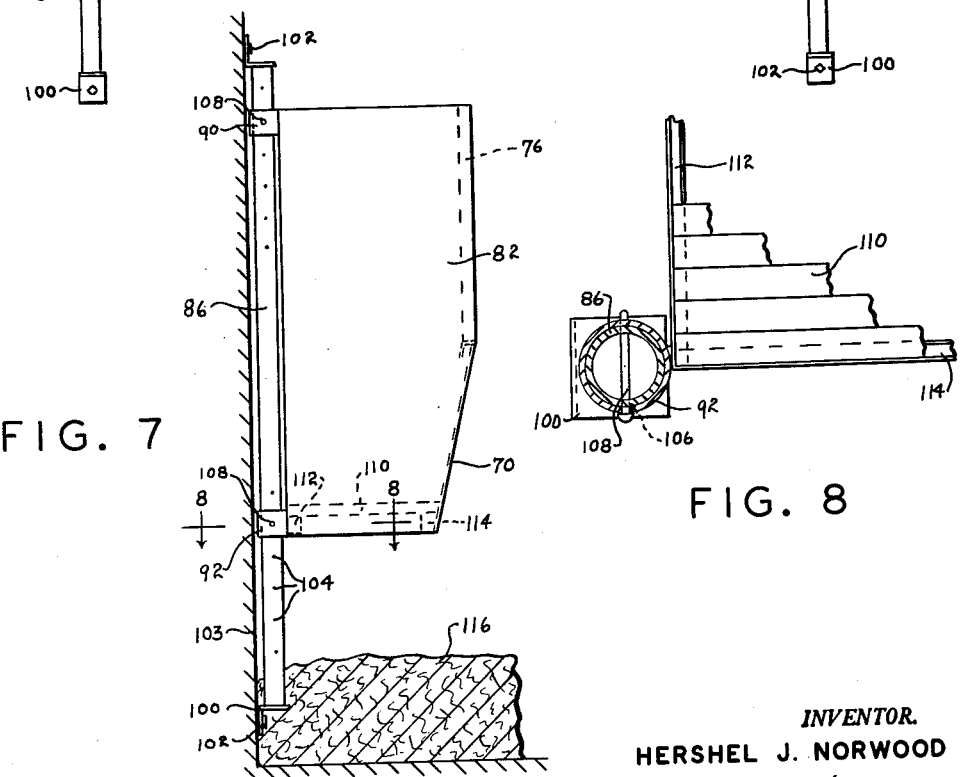
FIG. 7
FIG. 8
INVENTOR.
HERSHEL J. NORWOOD
BY
*M. A. Hobbs*
ATTORNEY

United States Patent Office 3,067,723
Patented Dec. 11, 1962

3,067,723
FEEDER
Hershel J. Norwood, Rte. 4, Elkhart, Ind.
Filed Jan. 7, 1960, Ser. No. 1,036
3 Claims. (Cl. 119—58)

The present invention relates to an apparatus for feeding livestock and the like, and more particularly to an apparatus for feeding hay, silage and similar feed to livestock in open pasture and feeding lots.

One of the principal objects of the present invention is to provide an apparatus for feeding hay and the like to livestock in a pasture or feeding lot, which permits a large quantity of hay to be placed in reach of the livestock without being spoiled, damaged or otherwise wasted while the livestock are feeding, and which can be readily moved from one location to another to provide clean surroundings for the apparatus.

Another object of the invention is to provide a stock feeding apparatus which can be supplied with feed from time to time without removing or opening doors or retainers in the apparatus and which permits the stock to safely reach all the feed in the apparatus without the animals interfering with the feeding of other animals.

Still another object of the invention is to provide a sturdy, portable livestock feeding apparatus of one-piece, rigid metal construction which can be readily transported as a completed unit from the manufacturing plant to the location where it is to be used and which can be moved from place to place by merely pulling or pushing the unit.

A further object is to provide a feeding apparatus which can be used either outdoors or indoors and which can be varied in height from the normal ground level as manure, straw and the like accumulate around the apparatus in order to maintain the feeding level at the most satisfactory position.

Another object of the invention is to provide a feeder of the aforesaid type which is simple in construction and easy to clean and maintain in a sanitary condition and which can be adapted to various types of feeds.

Other objects and advantages will become apparent from the following description and accompanying drawings, wherein:

FIGURE 6 is a front elevational view of a modified form of my feeding apparatus with a portion broken away;

FIGURE 7 is an end elevational view of the modified form of my feeding apparatus shown in FIGURE 6; and FIGURE 8 is a horizontal fragmentary cross sectional view of the modified feeding apparatus shown in the preceding figure taken on line 8—8 of said figure.

Figure 1:
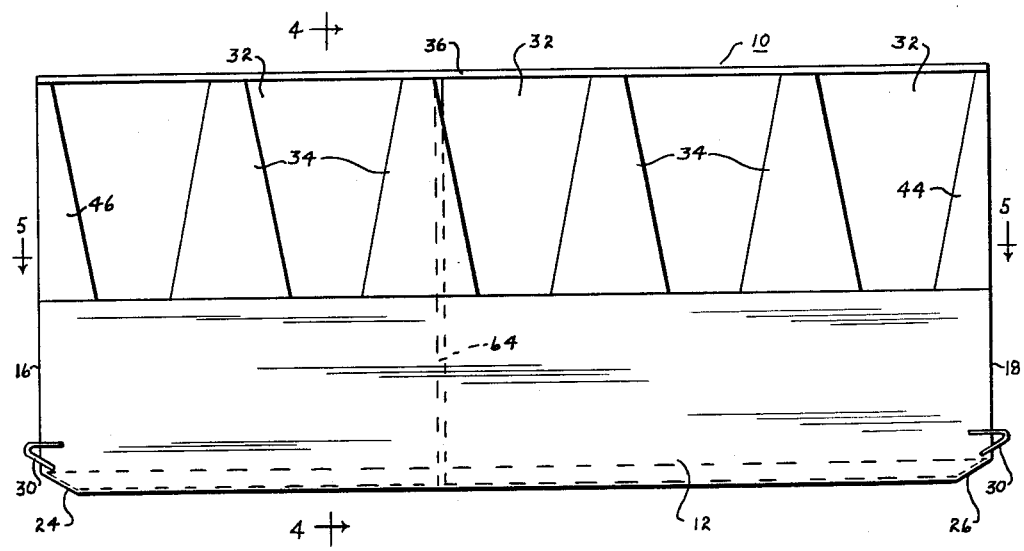
FIGURE 1 is a side elevational view of my feeding apparatus.
Figures 2, 4:
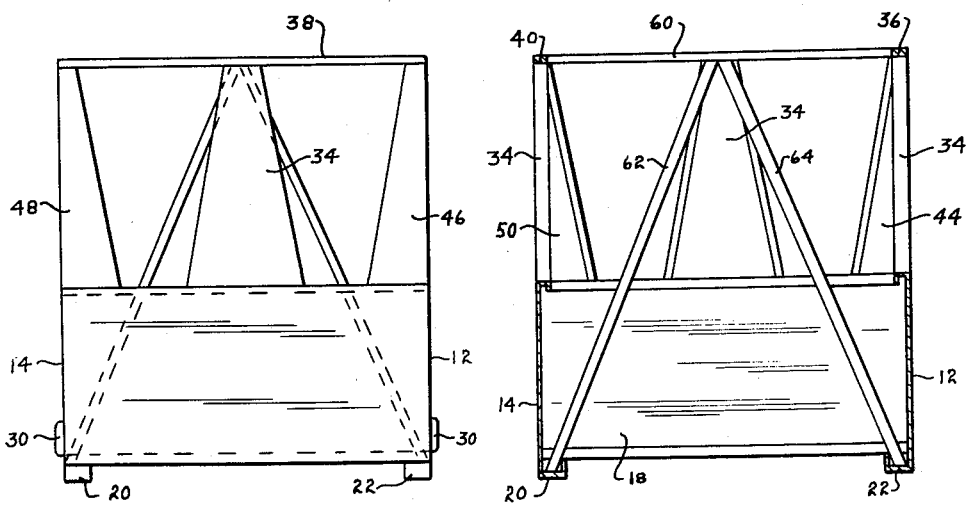
FIGURE 2 is an end elevational view of the feeding apparatus shown in FIGURE 1.
FIGURE 4 is a vertical cross sectional view of the feeding apparatus shown in the preceding figures, taken on line 4—4 of FIGURE 1.
Figure 3:
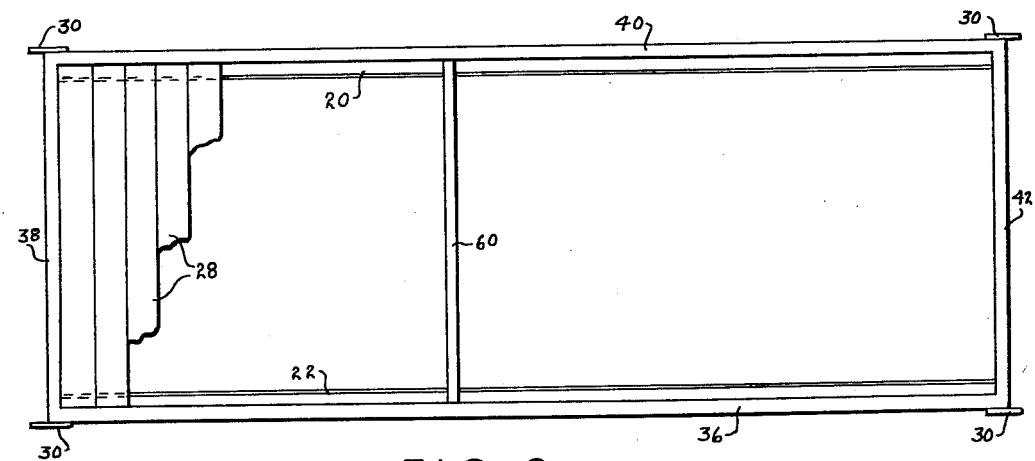
FIGURE 3 is a top plan view of one embodiment of the present feeding apparatus.
Figure 5:
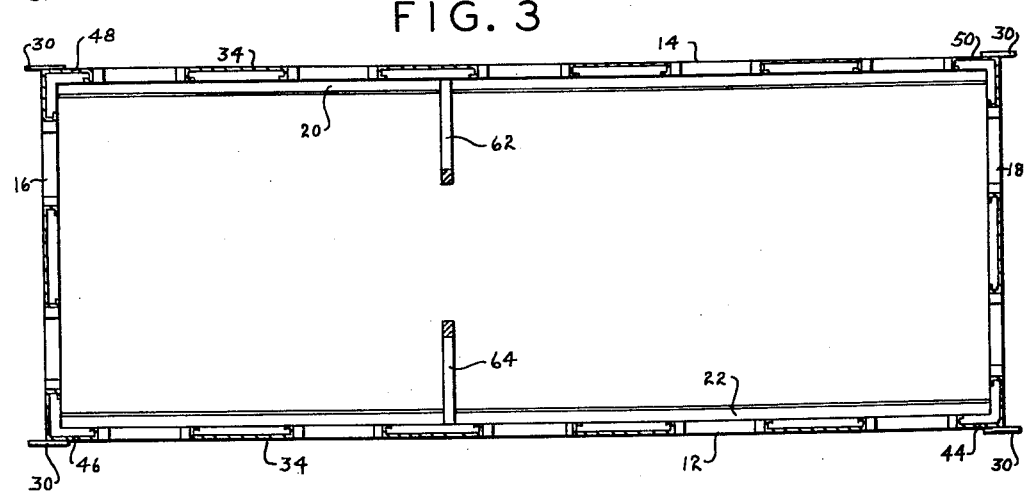
FIGURE 5 is a horizontal cross sectional view of the apparatus taken on line 5—5 of FIGURE 1.

Referring more specifically to the drawing, numeral 10 designates one embodiment of the present livestock feeding apparatus, including side panels 12 and 14 and end panels 16 and 18, the two side panels being joined to the two end panels preferably by welding, though other joining means such as riveting may be used if desired. The side and end panels are sheet steel of sufficient strength and thickness that no separate additional framing is required to form a rigid structure. The lower edges of panels 12 and 14 are turned inwardly under the unit to form runners 20 and 22 of channel shape throughout their length terminating at each end in downwardly and inwardly extending wedge shaped portions 24 and 26. These runners serve the additional function of supporting flooring such as boards 28 shown in FIGURE 3; usually, however, the apparatus is used without the flooring or any other type of bottom, and the feed placed in the apparatus rests on the ground. To facilitate moving the apparatus from one location to another, a loop 30 is attached to each corner of the unit so that a chain or rope can readily be connected thereto for pulling with a tractor.

One of the important features of the present feeding apparatus is the construction of the upper portion of the unit which provides the ports 32 for the livestock. The structure between the various ports consists of wedge-shaped sheet metal members 34 being continuous or solid from one edge to the other and having turned in and rounded vertical edges to provide smooth corners defining the ports. These vertical edges are rolled or bent inwardly on the back side of members 34 to give added strength as well as a smooth surface for the livestock. The upper edges of the side and end panels are likewise turned inwardly and downwardly to provide a smooth surface at the lower part of the ports. Members 34 are welded, riveted, or otherwise joined to the top edges of the side and end panels and are supported at the top to form a rigid, sturdy structure by bars 36, 38, 40 and 42 welded to the upper ends of members 34 and to adjoining ends of the respective bars. Corner members 44, 46, 48 and 50 are in effect two halves of members 34 joined at their right angle corners or are formed integrally as a single piece from sheet metal. The solid or continuous construction of members 34 and the corner members gives substantial protection and safety to the livestock in that the only places where they are able to reach through the feeding apparatus structure to the feed is at the safe ports provided for that purpose. This solid construction also assists in forming a sturdy construction of attractive appearance.

On relatively short feeding apparatus, no separate braces or supporting structures are needed in addition to that forming the outer structure described above; however, in exceptionally long units, one or more cross braces may be desirable. The one shown in the drawings consists of a rod 60 extending across the top of the unit and connected to bars 36 and 40 by welding, and two diagonal rods 62 and 64 seated at their lower ends in runners 20 and 22, respectively, and secured therein by welding and joined at their upper ends by welding to one another and to the center of rod 60, thus forming triangular braces for supporting both the bottom of side panels 12 and 14 and the intermediate portions of bars 36 and 40.

The unit just described is normally fabricated in a plant and shipped to the dealer or ultimate consumer ready for use without any flooring in the unit. If flooring is required, it can easily be installed by merely laying boards 28 cross-wise of the unit on runners 20 and 22 as separate, un-secured boards. The boards will remain in place throughout all normal use of the unit and can be easily removed at any time if the bottomless type is desired. The normal small spaces between the boards permit water from precipitation or from excess moisture in the feed to drain effectively from the apparatus.

The modified form of the apparatus shown in FIGURES 6, 7 and 8 is an adjustable type designed to be varied in height as manure, straw and other refuse accumulate on the ground around the unit. This unit consists of a front panel 70, members 72 defining and separating ports 74, corner members 76 and 78, and bar 80, all similar in construction to the corresponding parts of the embodiment previously described herein. The panel and members are joined to and supported by sheet metal end panels 82 and 84 which in turn are slidably mounted on vertical posts 86 and 88 by sleeves 90, 92, 94 and 96 at the top and bottom of the end panels. The posts are supported at the top and bottom by brackets 98 and 100 secured to a wall or other supporting structure by bolts or lag screws 102. The present modified form may be provided with a back (not shown), or the wall 103 to which the unit is attached may serve as the back of the unit. A series of vertically spaced holes 104 are provided in each of posts 86 and 88 and a hole 106 is provided in either the top or bottom sleeve, or both, on each post for receiving a pin 108 extending through the sleeve into a selected hole in the respective post to give the unit the desired height. To avoid the possibility of pins 108 being eaten by the livestock, they are preferably attached to the sleeves by a small chain (not shown). As an alternative to the pins and holes, a set screw means may be used in which a set screw in either the upper or lower sleeve or both at each end of the unit seats against the side of the post. A floor 110 is preferably included in the present modified form and is supported on longitudinal support members 112 and 114.

When it becomes necessary to raise the unit shown in FIGURES 6, 7 and 8, as a result of the refuse 116 accumulating on the floor or ground beneath the unit, pins 108 are removed from the sleeves and the unit is lifted by a lift on a tractor or by any other suitable means to the desired height and at selected holes in posts 86 and 88, and the pins are reseated in the sleeves. Such adjustments in height may be made from time to time as the refuse continues to build up, and after it has been removed, the unit is readjusted to its original low position.

Although steel has been mentioned as the structural material used in the construction of the present feeding apparatus, other materials such as fibre glass and aluminum may be used if desired. The apparatus may also be made in sections which are bolted, riveted or welded together after delivery of the unit. While only two embodiments of the invention have been described in detail herein, various other modified forms and changes may be made without departing from the scope of the invention.

I claim:

1. A stock feeding apparatus, comprising rectangular-shaped side and end panels, runners under said side panels, a plurality of wedge-shaped solid spacer members connected to the upper edges of said panels and defining spaced ports along said panels, angular wedge-shaped solid members at each corner, each corner member being connected to the upper edges of two adjacent panels in overlapping relationship, bars along the top of said members joined thereto, a bar across the center of the apparatus connected to oppositely disposed first-mentioned bars, and diagonally positioned bars extending from the center of said second-mentioned bar to a point near the bottom of said side panels.

2. A stock feeding apparatus as defined in claim 1 wherein the spacer and corner members are constructed of sheet metal and welded to said panels and first-mentioned bars.

3. A stock feeding apparatus as defined in claim 1 wherein a floor structure is mounted therein and supported by said runners.

References Cited in the file of this patent
UNITED STATES PATENTS

| | | |
|---|---|---|
| 486,508 | Scudder | Nov. 22, 1892 |
| 1,032,747 | Evans | July 16, 1912 |
| 1,367,614 | Maciejewski | Feb. 8, 1921 |
| 1,907,349 | Flanders | May 2, 1933 |
| 2,768,607 | McClure | Oct. 30, 1956 |